United States Patent
Bresciani

(10) Patent No.: US 8,702,021 B2
(45) Date of Patent: Apr. 22, 2014

(54) THERMALLY CONTROLLED COFFEE GRINDER

(75) Inventor: Roberto Bresciani, Ferndale, WA (US)

(73) Assignee: Wholesale Manufacturer Representatives Inc., Ferndale, WA (US)

( * ) Notice: Subject to any disclaimer, the term of this patent is extended or adjusted under 35 U.S.C. 154(b) by 152 days.

(21) Appl. No.: 13/411,488

(22) Filed: Mar. 2, 2012

(65) Prior Publication Data

US 2012/0286078 A1    Nov. 15, 2012

Related U.S. Application Data

(60) Provisional application No. 61/483,845, filed on May 9, 2011.

(51) Int. Cl.
  *B02C 4/32* (2006.01)
  *B02C 21/00* (2006.01)

(52) U.S. Cl.
  USPC .................. 241/35; 241/36; 241/65; 241/66

(58) Field of Classification Search
  USPC ......................... 241/33–37, 65–66
  See application file for complete search history.

(56) References Cited

U.S. PATENT DOCUMENTS

| 7,464,888 B2 * | 12/2008 | Malykke ......................... 241/36 |
| 2005/0098575 A1 * | 5/2005 | Carhuff et al. ............ 221/150 R |
| 2010/0251901 A1 * | 10/2010 | Santoiemmo ................. 99/323.2 |
| 2012/0091238 A1 * | 4/2012 | Os et al. ........................... 241/36 |
| 2013/0001339 A1 * | 1/2013 | Hoare et al. ..................... 241/33 |

* cited by examiner

*Primary Examiner* — Faye Francis
(74) *Attorney, Agent, or Firm* — Forrest Law Office, P.C.

(57) ABSTRACT

A thermally controlled coffee grinder and method are disclosed. In some embodiments, a thermally controlled coffee grinder may have a heating or cooling element to adjust the temperature of a component of the coffee grinder in response to a measured thermal state of a component in the grinder in order to improve dosing consistency, ground coffee quality, etc. In other embodiments, a thermally controlled coffee grinder may detect a thermal state in the coffee grinder and utilize a computer control to adjust for consistent dosing amounts.

14 Claims, 2 Drawing Sheets

THERMALLY CONTROLLED COFFEE GRINDER

RELATED APPLICATIONS

This application claims the benefit of U.S. Provisional Application No. 61/483,845, filed May 9, 2011.

BACKGROUND

It is conventional wisdom in the espresso industry that espresso grinders and their output of ground coffee should be cool to provide higher quality espresso beverages. It is common practice for espresso grinder manufacturers to install fans or other cooling devices in grinders for this purpose.

Historically, espresso grinders comprise a grinder and a doser assembly. A grinder is manually or automatically turned on to fill a doser to a predetermined level. In this way, an operator can then pull a lever to dose a certain amount of coffee into a portafilter, or group handle. Unfortunately, some ground coffee can sit in the doser for an extended period of time which in turn affects the freshness of the ground coffee as ground coffee loses its freshness much faster than whole coffee beans.

In an effort to solve this problem and ensure the coffee is ground fresh each time, manufacturers developed doserless grinders. Doserless grinders are purported to be accurate in terms of the dose of ground coffee they dispense. Doserless grinders often operate on a timed basis; hence 3-second activation would dispense less coffee than 4-second activation. Unfortunately, doserless grinder often provide inconsistent doses even when the variables of motor speed and grind size adjustment are consistent due to temperature differences in the grinder or in the beans within the grinder.

SUMMARY

Accordingly, an improved method and apparatus for thermally controlled coffee grinder is described below in the Detailed Description. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
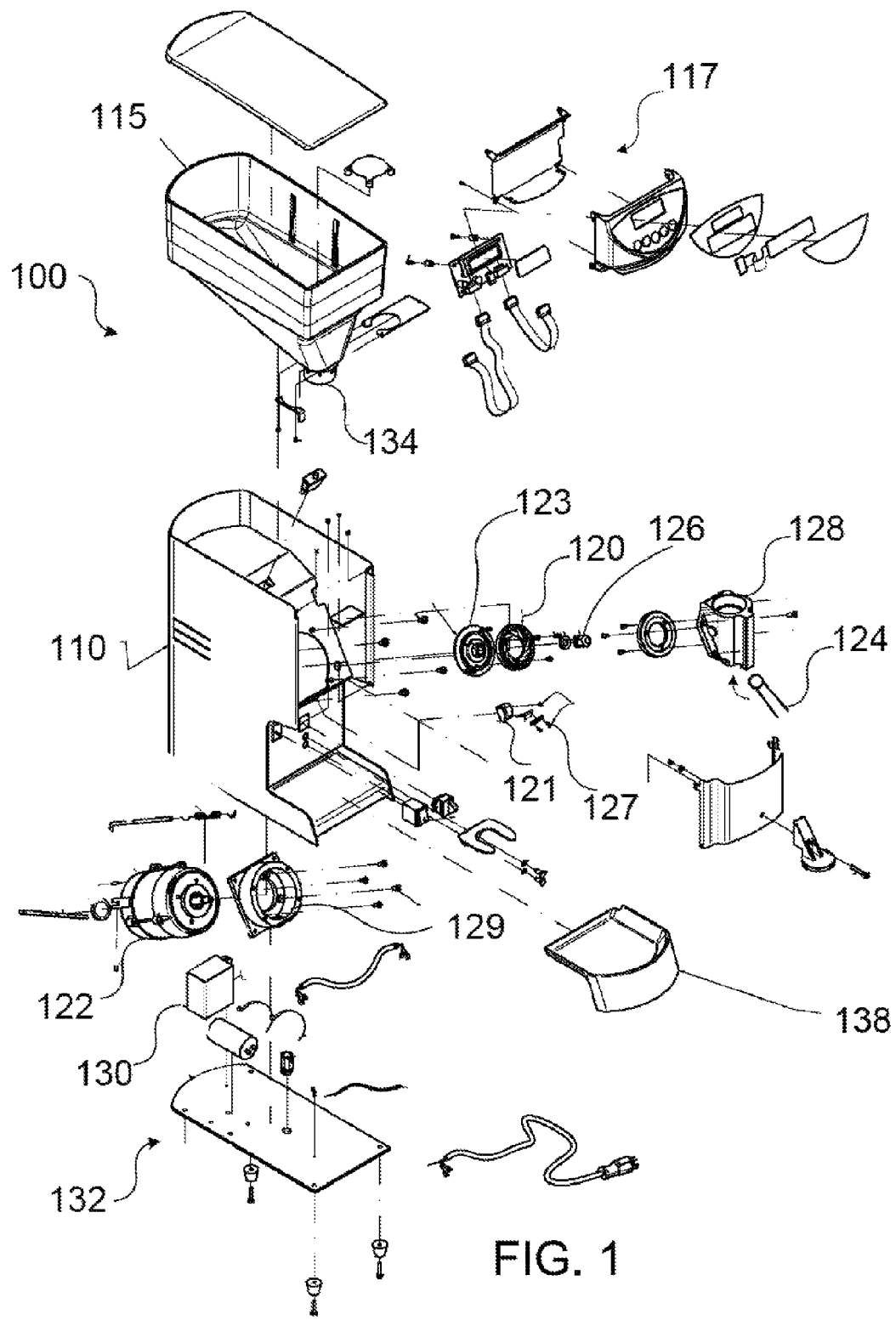
FIG. 1 shows an exploded view of one embodiment of a thermally controlled coffee grinder.

FIG. 1 shows an exploded view of one embodiment of a thermally controlled coffee grinder 100. Coffee grinder 100 includes an outer housing 110 with an inner housing 115 (similarly called a hopper) to store coffee beans, a mill 120 to grind coffee beans, and a milling motor 122 to power the mill 120, where all are situated substantially within the outer housing 110. Coffee grinder 100 also includes a thermal controller 124, an input control system 117, drive circuitry 130, a power system 132, a chute 134 and a tray 138.

A coffee grinder using thermal controlling can produce more consistent coffee doses and can be constructed without components that may affect the freshness of the ground coffee produced by the coffee grinder 100. For example, improved dosage control allows a coffee grinder 100 to be constructed with limited or no baffling in chute 134, which in turn reduces or eliminates ground coffee that can be held within the chute 134 for extended periods of time. In this way, when coffee beans are ground, the ground coffee will fully exit the chute and be used to make coffee closer to when the coffee beans were ground. Furthermore, as coffee grinders fluctuate in temperature from start up to sustained usage, the dosing and quality of ground coffee can be more effectively controlled using one or more thermal controls. This can be particularly relevant with ground coffee as grind fineness, granulometry and dosage greatly affect coffee extraction time while brewing and therefore overall beverage consistency.

In some embodiments, thermal controller 124 is used to measure a thermal state of one or more components of coffee grinder 100. In an exemplary embodiment, thermal controller 124 includes a positive temperature coefficient (PTC) thermistor and a heating element. In some embodiments the PTC thermistor may operate as the thermal controller 124. Additionally, in some embodiments the PTC thermistor may operate as a switch for the heating element. In this way, thermal controller 124 can detect a resistance change for electricity flowing through the PTC thermistor and can adjust an amount of power through the heating element to add heat, to reduce heat, to maintain a steady state, to run a controlled ramp or curve of temperature change, etc.

Thermal controller 124 may be placed in any part of coffee grinder 100 to thermally adjust or control the temperature of the grinder or of coffee beans or other matter being run through the coffee grinder 100. For example, thermal controller 124 may be placed in the head 128 to allow for thermal transfer with the beans in the grinding chamber. In other embodiments, the thermal controller 124 may also be placed in the inner housing 115 that is used to hold the coffee beans, the burr housing 129, the motor 122, or any other suitable place within the grinder 100 that is in thermal communication with the grinding chamber or with coffee beans going through the grinder. Additionally, a heating element may be placed on or near a connecting portion of the head 128 and the milling motor 122, or around the housing 129, etc., such as with a circular barrel style heater wrapped around the milling motor 122, the housing 129, etc.

In one exemplary embodiment, inner housing may be made of a metal, for example aluminum, or other high thermal conductivity material such that placement of the thermal controller in the inner housing 115 will provide a sufficient heat transfer to the coffee beans being milled in the coffee grinder. In some exemplary embodiments the inner housing may be aluminum, steel, stainless steel, pot steel, brass, copper, carbon fiber, plastic, other metal alloys or any other suitable material.

In some embodiments, single or multiple heating elements may be installed in a portion of a coffee grinder 100 that may in turn be controlled by a pct thermistor, a thermostat, or other thermal measuring component. An exemplary embodiment may use electric heating elements, but any heating element suitable for heating a component of coffee grinder 100 may be used.

In some embodiments, a thermal controller 124 may include a heating element and a cooling element. This will allow adjusting temperature of one or more components in the coffee grinder 100 within a range of temperatures within an upper and lower bound. That is, even greater temperature stability can be achieved due to the thermal control 124 being able to adjust temperature in either direction in response to a measured temperature or state in a component in the coffee grinder 110. For example, one or more of a fan, a Peltier chip, a water cooling/heating apparatus, etc., could be utilized in embodiments with heating and cooling elements. For example, water or fluid channels may be utilized within the head 128, housing 129, around the motor 122, within the inner housing 115, etc. In this way, hot water can be used to transfer thermal energy to one or more parts of the grinder 100 or coffee beans within the grinder and cool water may additionally be used to cool one or more parts of the grinder 100.

In some embodiments, a coffee grinder 100 may achieve a consistent dose by measuring a thermal state of coffee beans or a component of the coffee grinder, and then utilizing a computer control to adjust dosing in response to predetermined dose changes due to certain temperature states. That is, this embodiment may adjust dose in response to a temperature measurement without specifically adding or subtracting heat from a component in the coffee grinder. For example, the present embodiment may utilize a software program with a mapping equation to compensate for an increased or decreased dose resulting from the coffee grinder being either hot or cold relative to a measured dose at a given temperature. Some embodiments may utilize both thermal controls and computer controlling of dosage.

Figure 2:
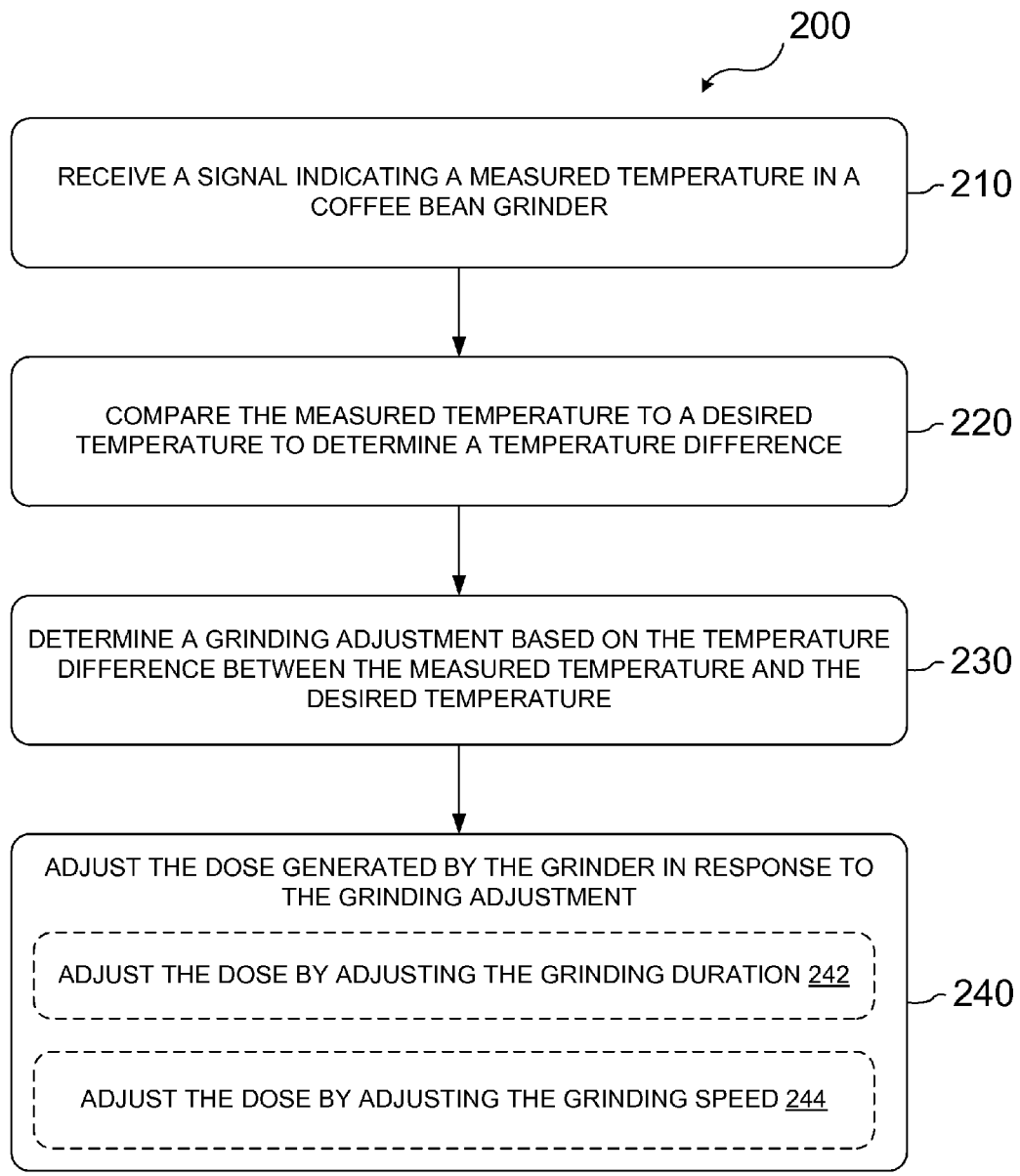
FIG. 2 shows a flow diagram of a method of operating a thermally controlled coffee grinder.

FIG. 2 shows a flow diagram of a method 200 of operating a thermally controlled coffee grinder. In one embodiment, a control system, such as input control system 117 in FIG. 1, includes software and/or firmware including a routine to thermally control the coffee grinder. For example in block 210 a control system may receive as an input a signal indicating a measured temperature in a coffee bean grinder. This signal may be a digital or analog signal representing an actual temperature measurement, or it may be a signal representing a change in another state through a measurement device that can be interpreted as a temperature measurement, temperature change, etc. For example, a resistance change through a PTC thermistor may be detected and the control system may determine this is due to a temperature change. In another example, a thermostat may detect an actual thermal state or temperature amount to forward a signal to control system. In this way, information representing a temperature state, a change in temperature state, or a change in an electrical state or other property can be utilized in method 200 as an input and can then be cast as a measured temperature.

Continuing with the current example, in block 220 method 200 then compares the measured temperature to a desired temperature to determine a temperature difference. Next, in block 230, a grinding adjustment can be determined based on the temperature difference between the measured temperature and the desired temperature. Then in block 240, a grinding dose can be adjusted in response to the grinding adjustment. For example, the dose could be adjusted by adjusting the grinding duration as shown in optional block 242, by adjusting the grinding speed, as shown in optional block 244, or by other suitable means that adjust the grinding dose in response to the temperature differences.

Other embodiments may adjust grinding dose in other manners according to the principles herein. For example, a grinding dose may be adjusted to be smaller as it heats up, larger as it heats up, smaller as it cools down, larger as it cools down, it may be adjusted on a curve or in a non-linear fashion yet still in response to a detected thermal state in the grinder, etc.

Additionally, by adjusting the grinding dose in response to a thermal state, a grinder can decrease and potentially obviate the need for baffling exiting the grinding chamber due to a decrease in static in the ground beans, due to different properties of the oils in ground coffee at different temperatures, etc. This can reduce cleaning requirements, can decrease the amount of stored coffee that has already been ground which in turn increases freshness of coffee made, decreases wasted ground coffee, etc.

Thermally controlled grinders may be used in stand alone grinders, in grinders placed within espresso machines, coffee machines, in attached grinders, in super automatic espresso machines with an automated brew group, in doser or doserless grinders, or generally in any coffee grinder whether augmented into another machine or as a stand alone unit.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A thermally controlled coffee grinder comprising:
   an inner housing to store coffee beans;
   a mill coupled with the inner housing, the mill including a grinding motor to power the mill to grind coffee beans; and
   a thermal controller to measure a thermal state of a component of the coffee grinder, the thermal controller including a heating element to heat at least one component of the coffee grinder in response to the measured thermal state in order to control a dose of coffee ground by the coffee grinder.

2. The thermally controlled coffee grinder of claim 1, wherein the thermal controller includes a positive temperature coefficient thermistor.

3. The thermally controlled coffee grinder of claim 1, wherein the thermal controller is placed in a head portion of the mill.

4. The thermally controlled coffee grinder of claim 1 comprising at least one additional heating element.

5. The thermally controlled coffee grinder of claim 1, further comprising a cooling element to allow temperature adjustment of one or more components in the coffee grinder within a temperature range.

6. The thermally controlled coffee grinder of claim 5, wherein the cooling element is one of a fan, a Peltier chip, or a water cooling apparatus.

7. The thermally controlled coffee grinder of claim 5, wherein the thermal controller is configured to heat or cool at least one component in the coffee grinder in response to a plurality of measured thermal states.

8. The thermally controlled coffee grinder of claim 1, wherein the inner housing is made of a high thermal conductivity material.

9. The thermally controlled coffee grinder of claim 8, wherein the inner housing is metal.

10. A thermally controlled coffee grinder comprising:
an inner housing to store coffee beans;
a mill coupled with the inner housing, the mill including a grinding motor to power the mill to grind coffee beans; and
a thermal controller to measure a thermal state of a component of the coffee grinder, the thermal controller including a computer control with a mapping equation to compensate for dosing changes resulting from temperature changes to adjust a dose in response to the measured thermal state and the mapping equation.

11. The thermally controlled coffee grinder of claim 10, wherein the dose is adjusted by adjusting grinding speed.

12. The thermally controlled coffee grinder of claim 10, wherein the dose is adjusted by adjusting grinding duration.

13. The thermally controlled coffee grinder of claim 10, wherein the thermal controller further includes a heating element to heat at least one component of the coffee grinder in response to the measured thermal state in order to control a dose of coffee ground by the coffee grinder.

14. The thermally controlled coffee grinder of claim 13, further comprising a cooling element to cool at least one component of the coffee grinder in response to a measured thermal state in order to control a dose of coffee ground by the coffee grinder.

* * * * *